April 13, 1971 R. T. GIRARD ET AL 3,574,584
METHOD OF FABRICATING GLASS COATED METAL SUBSTRATES
Filed May 15, 1969 2 Sheets-Sheet 1
FIG. 1
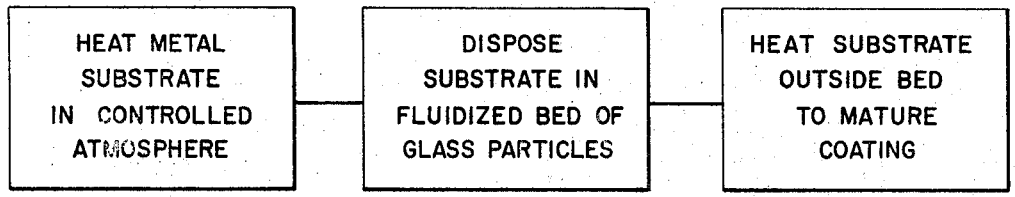
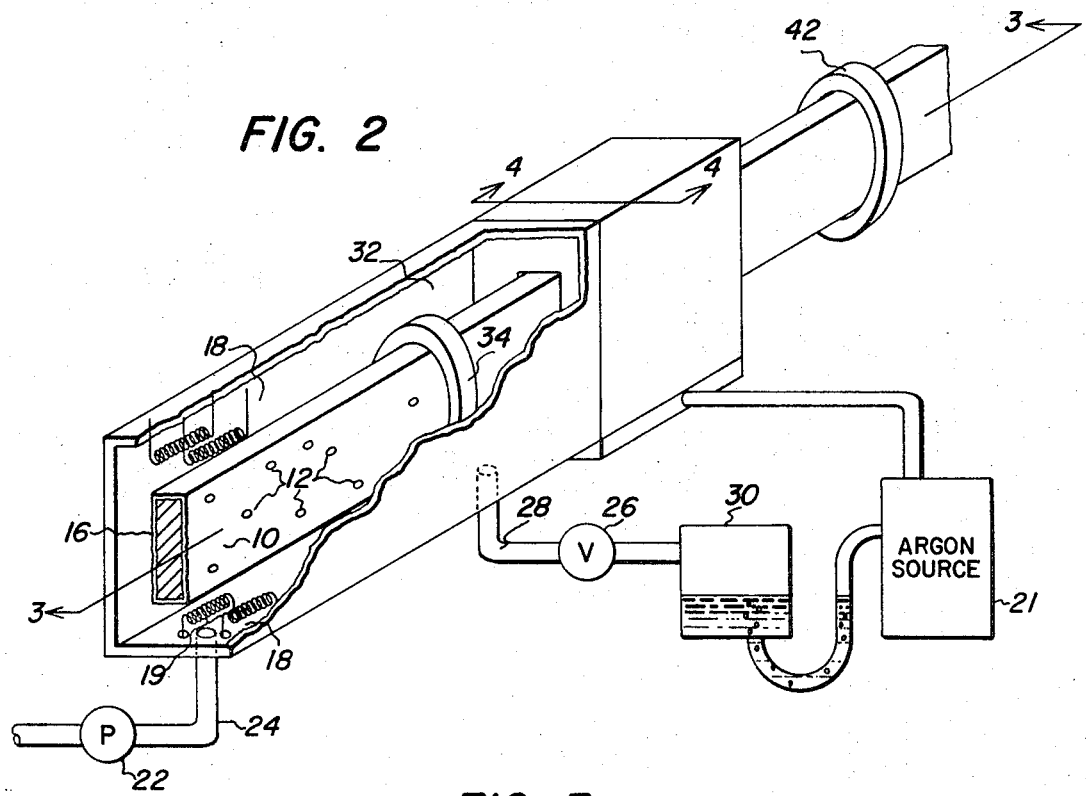
FIG. 2
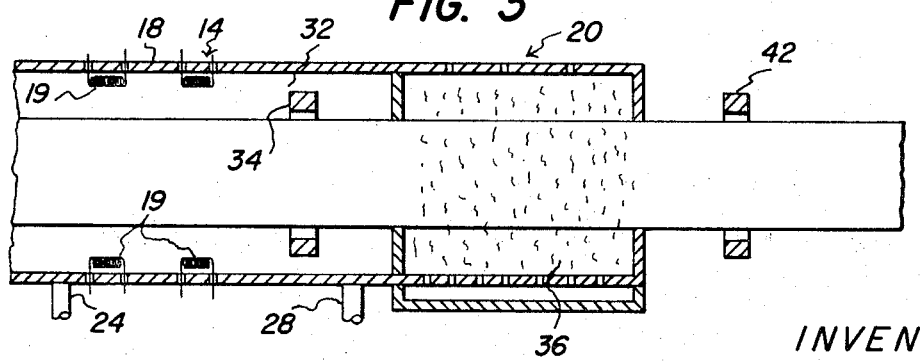
FIG. 3
INVENTORS:
ROLAND T. GIRARD,
MATTHEW J. CURRAN,
by John J. Kinsane
THEIR ATTORNEY April 13, 1971  R. T. GIRARD ET AL  3,574,584
METHOD OF FABRICATING GLASS COATED METAL SUBSTRATES
Filed May 15, 1969  2 Sheets-Sheet 2
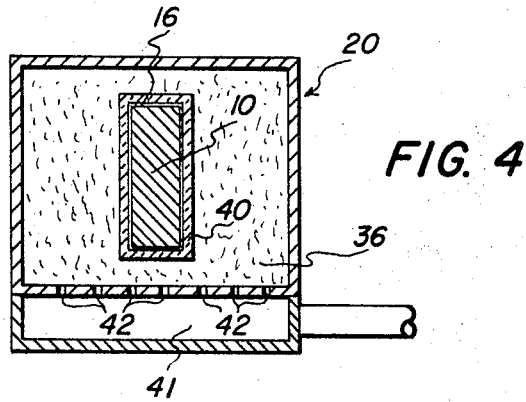
FIG. 4
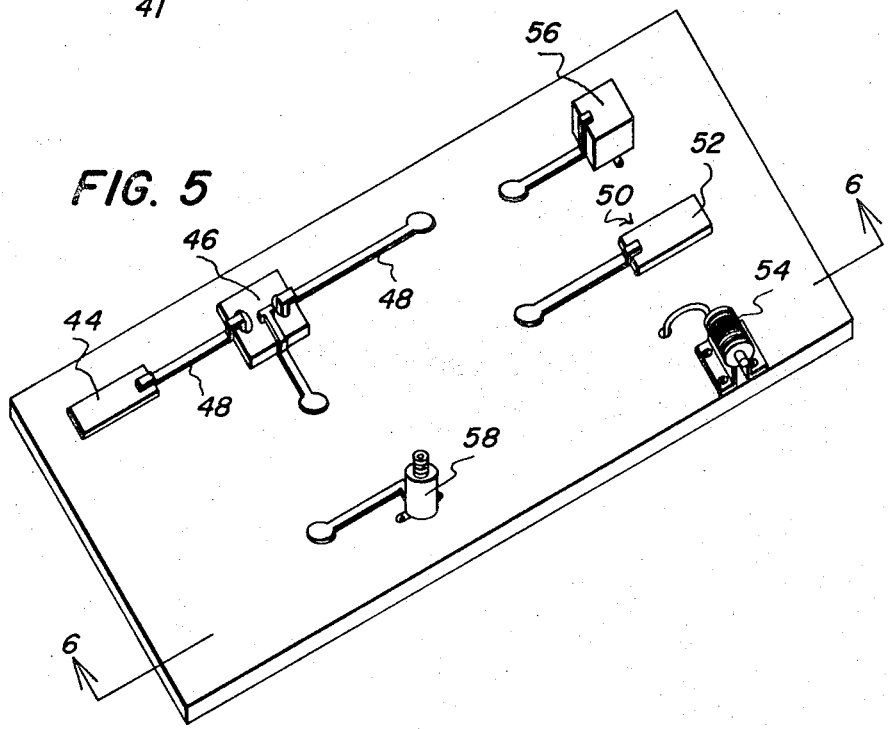
FIG. 5
FIG. 6
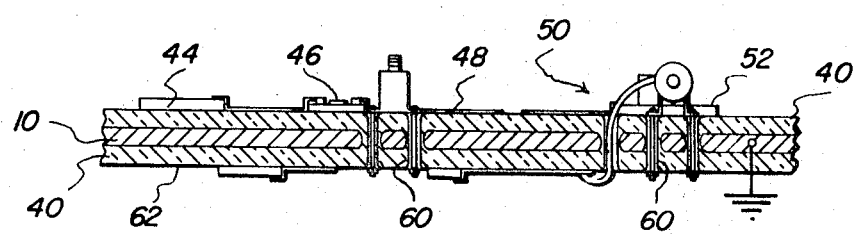
INVENTORS:
ROLAND T. GIRARD,
MATTHEW J. CURRAN,
by
THEIR ATTORNEY

United States Patent Office 3,574,584
Patented Apr. 13, 1971

3,574,584
METHOD OF FABRICATING GLASS COATED METAL SUBSTRATES
Roland T. Girard, Scotia, and Matthew J. Curran, Schenectady, N.Y., assignors to General Electric Company
Filed May 15, 1969, Ser. No. 824,948
Int. Cl. C03c 29/00, 7/00
U.S. Cl. 65—59                                12 Claims

ABSTRACT OF THE DISCLOSURE

Pinhole free, glass coated iron substrates suitable for utilization as radio chassis are formed by heating the iron substrate above 500° C. in a controlled atmosphere to limit oxidation of the iron substrate surface to less than approximately 30,000 A., immersing the surface oxidized substrate in a fluidized bed of glass particles, e.g. vitreous enamel frit ground to a narrow particle size range, to fuse the particles to the substrate surface and subsequently firing the coated substrate outside the fluidized bed at a temperature above 500° C. to mature the glass coating. Desirably the final firing employs heat generated within the substrate, e.g. by induction or resistance heating of the substrate, to bake the glass outwardly from the substrate-glass interface thereby maximizing the density of the glass coating.

---

This invention relates to a method of forming glass coatings atop a metallic substrate and in particular, to the formation of thin, pinhole free glass coatings by disposing a controlledly oxidized substrate in a fluidized bed of glass particles to fuse the particles to the substrate and subsequently maturing the glass coatings by firing the coated substrate outside the fluidized bed at temperatures above 500° C.

Among techniques heretofore employed to form vitreous enamel coatings atop metallic substrates is the dip-coating of the metallic substrate in a liquid slurry of ground enamel frit and the subsequent firing of the coated substrate in a furnace above 500° C. to mature the enamel. If discontinuities, such as apertures, are present in the dip-coated substrate however, surface tension in the liquid slurry and in the softened enamel during firing tends to expose the edges of the apertures. Moreover radiant heat firing of the enameled substrate forms a surface glaze during the initial stages of maturing thereby blocking surface emission of gaseous occlusions from the enamel coating. Thus, voids are produced within the radiant heated enamel tending to reduce the electrical insulating qualities of the vitreous enamel coating.

Ground enamel frit particles also have been spray deposited atop metallic substrates to reduce the moisture content of the deposited enamel by evaporation of water during the spraying. While enamel spraying produces slightly better coverage of aperture edges than dip-coating techniques, liquid tension in the sprayed enamel frit negates edge coverage at the aperture sites adequate for electrical insulating purposes and a plurality of coatings are required to assure complete edge coverage.

Applicants however have discovered that continuous pinhole free glass coatings can be applied to a selectively apertured metallic substrate by immersion of the heated substrate in a fluidized bed of glasseous particles. Although fluidized beds previously have been utilized to deposit low melting point polymeric materials on various substrates, the high substrate temperature, e.g. above 500° C., required for fusion of glass particles to the substrate tends to overoxidize the substrate and destroy the adherence of the enamel thereon. Thus, fluidized bed coating techniques heretofore have been generally used for the application of low temperature melting point materials with glass encapsulations being accomplished by conventional spray and dip-coating techniques. By heating the substrate under controlled conditions to limit oxidation of the substrate, applicants have been able to successfully employ fluidized bed techniques for applying glass coatings to metallic substrates. Moreover, the glass coatings applied by the fluidized bed technique of this invention exhibit superior edge coverage and equivalent adhesion.

It is therefore an object of this invention to provide a novel method of forming pinhole free, glass coatings on apertured metallic substrates.

It is also an object of this invention to provide a method of forming smooth, high density glass coatings on a metallic substrate.

It is a further object of this invention to provide a method of forming a thin porcelain coated metallic substrate suitable for utilization as a radio chassis.

It is a still further object of this invention to provide a fluidized bed method of enameling wherein oxidation of the metal substrate is precisely controlled to inhibit flaking.

These and other objects of this invention are achieved by heating a metallic substrate above 500° C. under controlled conditions to form an oxide layer less than 30,000 A. thick atop the substrate whereupon the heated metallic substrate is disposed in a fluidized bed of glass particles for a period sufficient to fuse a 2 to 10 mil thick glass layer atop the substrate. After fusion of the glass coating thereon, the substrate is removed from the fluidized bed and fired at a temperature above 500° C. to mature the glass coating. Preferably the initial heating of the substrate is conducted in an atmosphere having a limited quantity, e.g. less than 10% by volume, of oxygen capable of reacting with the heated substrate while the final firing of the glass coated substrate desirably is produced by heat generated within the metallic substrate to mature the glass layer outwardly from the substrate-glass interface thereby maximizing the density of the deposited coating.

The novel features believed characteristic of the invention are set forth in the appended claims. The invention itself, together with further objects and advantages thereof may best be understood by reference to the following description, taken in connection with the accompanying drawings, in which:

FIG. 1 is a flow chart illustrating in block diagram form the glass coating method of this invention, FIG. 2 is an isometric illustration of an apparatus suitable for utilization in the performance of this invention, FIG. 3 is a sectional view taken along lines 3—3 of FIG. 2, FIG. 4 is a sectional view taken along lines 4—4 of FIG. 2, FIG. 5 is an isometric view illustrating the utilization of a substrate coated in accordance with this invention as a radio chassis, and FIG. 6 is a sectional view taken along lines 6—6 of FIG. 5.

The preferred method of this invention for forming a continuous, dense glass insulator atop a metallic substrate is illustrated in FIG. 1 and generally comprises heating the metallic substrate within a sealed chamber containing less than 10% by volume reactive oxygen to controlledly oxidize the surface of the substrate, disposing the heated substrate within a fluidized bed of glass particles having a melting point below the substrate temperature to fuse a two to ten mil thick glass coating atop the substrate and subsequently heating the coated substrate in air at a temperature above 500° C. to mature the glass coating atop the substrate.

A suitable apparatus for the deposition of a glass insulator atop a metallic substrate is depicted in the specific example of FIG. 2 wherein a rectangular cross-sectioned substrate 10 of, for example, enameling iron, i.e. iron with less than 0.2% carbon, serves as the substrate to accept a vitreous enamel deposition. Typically the substrate 10 is less than 100 mils, and preferably between 20 to 60 mils thick and is characterized by a plurality of apertures 12 at selected intervals along the substrate length to permit the subsequent passage of electrical wiring or mechanical fastening devices therethrough. Prior to passage into heating chamber 14, the metallic substrate is prepared in a conventional fashion, e.g. by cleaning with a commercially available alkali cleaner and pickling the substrate sulface with a 6–87% solution of hydrochloric or sulfuric acid to remove the metal scale. A thin nickel strike film 16 then is chemically deposited atop the substrate, e.g. ¼ gram nickel per square foot substrate, to increase the adhesion of the enamel to be deposited thereon.

After coating of the apertured substrate with the nickel strike film, the substrate is introduced into a first stage 18, e.g. a conventional electric furnace, of heating chamber 14 for preheating the substrate to a red-heat, e.g. a temperature above 500° C. by suitable electrical energization of heating coils 19. To inhibit excessive oxidation of the heated substrate prior to positioning of the substrate in the fluidized bed of coating chamber 20, the environment of chamber 14 is carefully controlled to assure the reactive oxygen content of the chamber does not exceed 10% by volume of the chamber. To effect such result, an exhaust pump 22 communicated with the interior of the heating chamber by conduit 24 is energized to exhaust atmospheric gases from the chamber prior to heating of the substrate therein while a control valve 26 serves to completely fill the chamber with an inert gas such as nitrogen, argon, helium, or mixtures thereof by way of conduit 28. Because some, e.g. between 500 A. and 30,000 A., oxide coating on substrate 10 is required to assure a proper adhesion of the subsequently to be deposited enamel thereon, the humidity of the inert gases is carefully controlled to provide the desired amount of reactive oxygen for the substrate. For example, argon having a relative humidity between 50% and 100% at room temperature has been found to produce optimum oxidation of a nickel coated iron substrate heated for a period of 2 minutes at a temperature above 700° C. in the argon atmosphere. To obtain the desired humidity in the argon atmosphere of heating chamber 14, argon from source 21 is bubbled through a cold water bath 30 prior to admission to the heating chamber and the atmosphere within the chamber is continuously replenished to maintain the desired reactive oxygen content within the chamber. Although heating of the substrate prior to immersion in the fluidized bed preferably is conducted in a completely inert gaseous atmosphere with the controlled relative humidity of the atmosphere regulating the degree of oxidation of the substrate, a mildly oxidizing gas such as carbon dioxide or limited quantities of oxygen also can be pumped through the heating chamber to effect the desired oxidation of the substrate.

After preheating the substrate to a temperature preferably between 650 to 700° C. in the first stage 18 of heating chamber 14, substrate 10 is passed to the second stage 32 of the heating chamber wherein a suitably energized, e.g. 450 kc., R.F. coil 34 circumferentially disposed about the substrate heats the substrate to a temperature at which the vitreous enamel particles of fluidized bed 36 will fuse to the substrate surface, e.g. 800° C. for −200 mesh to +270 mesh ground vitreous enamel #208 sold by the Ferro Enamel Company. It will be appreciated that a single R.F. heating stage can be employed for those enamels or glasses having fusion temperatures below 650° C. However, for the majority of glasses and enamels having a fusion temperature above 650° C., a two stage heating chamber is desired because iron substrates in a thickness of 20 to 60 mils tend to warp when heated above 700° C. solely by R.F. excitation of the substrate. Similarly, although frequencies of, for example, 360 cycles per second (below those conventionally designated as R.F. frequencies) also can be employed for heating substrate 10, eddy current flow induced by A.C. frequencies below 120 cycles per second generally produce uneven heating of the substrate.

When the speed of enamel deposition upon substrate 10 is sufficiently fast to permit a rapid, e.g. 1 minute or less, passage of the substrate through heating chamber 14, an oxide coating below 30,000 A. can be formed on iron substrates heated in the presence of air. To heat the substrate in air, however, the temperature of furnace 14 must be at least 1,000° C. to raise the substrate to the 800° C. fusion temperature of the enamel within the one minute heating interval. Rapid passage of the substrate through the various heating and coating stages for continuous processing of the substrate also makes annealing and deposition parameters difficult to control. Relatively slow heating of the substrate in a controlled oxygen environment therefore is preferred in the practice of this invention.

After heating substrate 10 to 800° C. in heating chamber 14, the heated substrate is introduced into coating chamber 20 containing a fluidized bed 36 of enamel particles ground to a suitable dimension to fuse to the iron substrate, e.g. enamel frit ground to a particle range beetween −200 mesh and +270 mesh. Coating chamber 20 can be any commercially available fluidized bed bath with the illustrated embodiment suspending the enamel particles by the passage of pressurized gas through manifold 41 and a plurality of apertures 42 situated at the bottom of the chamber. Desirably, substrate 10 is immersed in the fluidized bed for the period required to produce a 2 to 5 mil thick enamel coat 40 thereon with thicker coats, e.g. up to 10 mils, being formed by a multiple passage of the substrate through the coating chamber. For substrate temperatures of 800° C., an immersion in −200 mesh to +270 mesh enamel frit suspended by an air flow between 6–30 cubic feet generally has been found to provide a 3 mil thick enamel coating atop the substrate with superior edge covering. Notwithstanding the rapid coating of substrate 10 by the enamel particles forming fluidized bed 36, inert gas from argon source 21 preferably is employed for suspending the particles to inhibit overoxidizing the substrate surface. Good segregation of the particles by the inert gas is desirable for uniform coating of substrate 10 with each particle ideally being independently suspended by the velocity of the gas moving through the bed.

Although fluidized bed has been described as being formed of vitreous enamel particles, desirably up to 50% by volume of an inert filler selected from the group consisting of magnesium oxide, silicon dioxide, aluminum oxide, lithium titanate and mixtures thereof, can be added to the enamel particles to reduce the effects of the surface tension of the enamel during subsequent firing of the coated substrate. In general, a 20 to 30% by volume inert filler concentration is optimum when magnesium oxide and silicon dioxide are employed as fillers while a slightly lesser concentration, e.g., 10 to 15% filler, is utilized with aluminum oxide fillers because of the diverse coefficients of expansion between the aluminum oxide and the underlying enameling iron substrate. Materials capable of being taken into solution by the enamel, e.g. conventional enamel colorants or opacifiers, also can be employed in the fluidized bed if desired.

Although this invention is particularly suited for the application of vitreous enamel to metallic substrates, the method of the invention also can be employed to coat metallic substrates with an insulating layer of one or more glasses, e.g. a borosilicate glass, magnesium oxide or any high purity siliceous glass. Desirably the thermal coefficient of expansion of the glass should be approximately equal to or somewhat lower than the thermal coefficient of expansion of the metallic substrate and suitable inert granular fillers, such as magnesium oxide, silicon dioxide, aluminum oxide and lithium titanate, in concentrations between 20% and 30% by volume of the coating are mixed with the glass particles forming the fluidized bed. Thus a low expansion borosilicate glass and a low expansion filler such as aluminum oxide suitably would be employed to form a pinhole free coating less than 10 mils thick for a low expansion substrate material such as Kovar. Because the granular structures of the inert fillers tend to be stationary and therefore resistant to flow during subsequent heating of the coated substrate, the uniformity of the coating upon the substrate is maximized. Furthermore, the inert fillers generally exhibit an electrical insulating characteristic superior to the glass coating material to increase the dielectric strength or resistivity of the deposited coating.

If desired, multiple layers of glass and/or enamel also can be deposited atop a metallic substrate in accordance with this invention by passing the substrate through successive fluidized beds of the chosen materials. For example, a good adhesive material such as ground coat vitreous enamel advantageously may be initially deposited atop the substrate in a first fluidized bed whereupon the lightly coated substrate is passed to a second fluidized bed to be coated with a glass having superior electrical characteristics, e.g. a borosilicate glass.

Although R.F. heating of substrate 10 and coating of the substrate with the fluidized bed enamel particles also can be achieved in a single operation by disposing R.F. coil 34 about the exterior of coating chamber 20, a far smoother surface is obtained in the finished coating material when all heating of the substrate is accomplished outside the fluidized bed. Thus, when the coated substrate is to accept a subsequent thin or thick film deposition, separate heating and coating chambers should be employed. Although not specifically illustrated, the particles forming fluidized bed 36 could be preheated to place a thicker coating upon the substrate in a single pass through chamber 20 or an electrostatic field could be formed within the deposition chamber to enhance the deposition rate of the particles upon the substrate surface.

Subsequent to the fusion or enamel coating 40 atop the heated substrate, the coated substrate is passed axially through induction heating coil 42 disposed externally of the controlled environment of the preheat and fluidized bed chambers. Heating coil 42 is similar to R.F. coil 34 and preferably is energized with an electrical signal of approximately 450 kc. to heat the coated substrate to a temperature of between 730 and 800° C. for a period sufficient to react the enamel with the oxide coating atop the substrate without driving all the oxide into solution. In general, R.F. heating for 5 minutes at 730° or 1½ minutes at 870° has been found to react the enamel with an underlying oxide coating of less than 30,000 A. at a rate sufficiently slow to permit the desired reaction without a warping of the metallic substrate.

During the final firing of the coated substrate, enamel coating 40 tends to soften and there is some thinning of the enamel atop the substrate. The inert granular particles mixed with the enamel however do not soften at the firing temperatures thereby reducing the effect of surface tension in the softened enamel tending to remove the enamel from the edges of apertures 12 in substrate 10. Because induction heating of the substrate effects a maturing of the enamel by heat generated within the substrate, the enamel coating matures outwardly from the substrate-enamel interface and gaseous occlusions tend to rise out of the coating. Thus, enamels formed by substrate generated heat characteristically exhibit a density of approximately at least 95% while radiantly heated enamels exhibit a density below 60% due to trapping of gaseous occlusions by the initially formed surface glaze atop the enamel.

It is to be appreciated that other suitable methods of generating heat at the substrate-vitreous enamel interface also can be employed to mature the enamel, e.g. the porcelain coating could be matured by resistance heating of the substrate to a temperature between 700° C. and 900° C. Similarly the initial heating of the substrate or the subsequent maturing of the enamel coating can be accomplished by passing the substrate through a metal microwave cavity energized with microwave power at the resonant frequency of the cavity. The R.F. electric field thereby is concentrated in the central region away from the surfaces of the cavity and the substrate at the center of the cavity is heated by the microwave energy to a working temperature. When microwave heating of the substrate is accomplished in the fluidized bed, the enamel particles fuse to the heated substrate to form an enamel coating atop the substrate. Conventional induction heating or microwave heating then can be employed to mature the enamel outside the fluidized bed.

After suitably maturing enamel coating 40 atop substrate 10, the substrate is disected into suitable lengths to permit the fabrication of electrical circuitry thereon. FIGS. 5 and 6 illustrate a preferred utilization of the enamel coated apertured substrate of this invention as the chassis of a conventional superheterodyne radio receiver operating on 125 volt A.C. house current. For purposes of economy, enamel coating 40 generally is less than 5 mils thick and the pinhole free characteristics of enamel coatings deposited in accordance with this invention permit the enamel to accept thick film or thin film electrical components directly theron. For example, in the illustrated figures, a cermet resistor 44 may be vacuum deposited over a selected area of the enamel surface to form a biasing resistor for semiconductive components 46 of the superheterodyne receiver with suitable interconnections, e.g. copper leads 48, being vacuum deposited to join selective components of the receiver. The density and pinhole free characteristics of the porcelain coating also permit the formation of a capacitor 50 by thick film deposition of a suitable electrode 52, e.g. of palladium silver, atop the substrate with electrically grounded metallic substrate 10 and the insulating enamel coating forming the counter electrode and dielectric layer of the capacitor, respectively. Those structural components which do not lend themselves to vacuum or thin film deposition atop the substrate, e.g. tunable condenser 54, I.F. transformers 56 and R.F. oscillator coils 58, are mechanically mounted to the coated substrate by bolts 60 extending through apertures 12 or by soldering to metallization previously applied through the apertures. Because substrate 10 is uniformly coated with enamel coating 40, selective components of the receiver also can be positioned along the lower face 62 of the enamel coated substrate with insulated leads from components along the upper surface being drawn through apertures in the substrate to receiver components situated along the lower surface of the substrate. The superior edge covering characteristics of the enamel deposition technique of this invention permits the omission of insulating gaskets from the apertures through which the insulated leads are drawn.

What we claim as new and desire to secure by Letters Patent of the United States is:

1. A method of forming a continuous, dense layer of a glass insulator atop a metallic substrate comprising heating said substrate above 500° C. to form an oxide layer less than 30,000 A. thick atop said substrate, agitating a multitude of glass particles with a gaseous stream to form a fluidized bed of said particles, said glass particles having a melting point below the temperature of said heated substrate, disposing said heated substrate in said fluidized bed for a period sufficient to deposit a 2–10 mil thick glass layer atop said substrate, removing said glass coated substrate from said fluidized bed and firing said glass coated substrate at a temperature above 500° C. to mature and seal said glass coating.

2. A method of forming a continuous, dense layer of a glass insulator atop a metallic substrate according to claim 1 wherein said substrate is heated in a controlled atmosphere containing less than 10% by volume reactive oxygen prior to disposal within the fluidized bed.

3. A method of forming a continuous, dense layer of a glass insulator atop a metallic substrate according to claim 2 wherein said firing of said glass coated substrate is effected by heat generated within said metallic substrate to cure said glass layer outwardly from the substrate-glass interface.

4. A method of forming a continuous, dense layer of a glass insulator atop a metallic substrate according to claim 3 wherein said glass insulator is a vitreous enamel and said substrate is a selectively apertured metallic sheet.

5. A method of forming a continuous, dense insulating layer of a glass insulator atop a metallic substrate according to claim 4 wherein said glass insulator includes less than 50% by volume of an inert granular filler having a melting temperature above the heated temperature of said substrate.

6. A method of forming a continuous, dense layer of a glass insulator atop a metallic substrate according to claim 5 wherein said granular filler consists of a material selected from the group consisting of magnesium oxide, silicon dioxide, aluminum oxide and lithium titanate, said filler forming between 20 to 30% by voulme of said glass layer.

7. A method of forming a continuous, dense layer of a glass insulator atop a metallic substrate according to claim 3 wherein said glass is selected from the group consisting of high purity siliceous glasses, borosilicate glasses and magnesium oxide.

8. A method of forming a continuous, dense layer of a glass insulator atop a metallic substrate according to claim 2 wherein said controlled atmosphere consists essentially of a gas selected from the group consisting of nitrogen, argon, helium, carbon dioxide and mixtures thereof, the moisture content of said gases being controlled to limit oxidation of said substrate.

9. A method of forming a continuous, dense layer of a glass insulator atop a metallic substrate according to claim 8 wherein said controlled atmosphere is flowing argon having a relative humidity in a range between 50 and 100% at room temperature.

10. A method of forming a continuous, dense layer of a glass insulator atop a metallic substrate according to claim 8 wherein said subsequent heating is conducted at a temperature between 730 and 870° in air.

11. A method of forming a continuous, dense layer of a glass insulator atop a metallic substrate according to claim 1 wherein said metallic substrate is heated above 500° C. within said fluidized bed.

12. A method of forming a continuous, dense layer of a glass insulator atop a metallic substrate according to claim 1 wherein the particles forming the fluidized bed are preheated prior to deposition of said substrate within said bed.

References Cited
UNITED STATES PATENTS

| | | | |
|---|---|---|---|
| 2,680,085 | 6/1954 | Rauber, Jr. | 117—129X |
| 2,786,307 | 3/1957 | Pither | 117—23X |
| 3,114,646 | 12/1963 | Currie | 117—129X |
| 3,437,505 | 4/1969 | Narken et al. | 117—23 |
| 3,465,424 | 9/1969 | Deringer | 65—60 |

FRANK W. MIGA, Primary Examiner

U.S. Cl. X.R.

65—32, 60; 117—23, 129